(12) United States Patent
Irie et al.

(10) Patent No.: US 10,317,671 B2
(45) Date of Patent: Jun. 11, 2019

(54) IMAGING DEVICE AND WATERDROP GUIDING MEMBER

(71) Applicant: CLARION CO., LTD., Saitama (JP)

(72) Inventors: Kota Irie, Saitama (JP); Hayato Tsuchihashi, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 298 days.

(21) Appl. No.: 15/117,488

(22) PCT Filed: Dec. 12, 2014

(86) PCT No.: PCT/JP2014/082970
§ 371 (c)(1),
(2) Date: Aug. 9, 2016

(87) PCT Pub. No.: WO2015/122090
PCT Pub. Date: Aug. 20, 2015

(65) Prior Publication Data
US 2016/0349502 A1    Dec. 1, 2016

(30) Foreign Application Priority Data
Feb. 14, 2014 (JP) ................................. 2014-026619

(51) Int. Cl.
*B60R 1/00* (2006.01)
*G02B 1/18* (2015.01)
(Continued)

(52) U.S. Cl.
CPC ............ *G02B 27/0006* (2013.01); *B60R 1/00* (2013.01); *B60R 11/04* (2013.01); *B60R 13/07* (2013.01);
(Continued)

(58) Field of Classification Search
CPC ...... G02B 27/0006; G02B 1/18; G03B 17/02; G03B 17/08; B60R 1/00; B60R 11/04; B60R 13/07; B60R 2011/004
See application file for complete search history.

(56) References Cited

U.S. PATENT DOCUMENTS

| | | |
|---|---|---|
| 2001/0035490 A1 | 11/2001 | Mishima et al. |
| 2004/0065805 A1 | 4/2004 | Mishima et al. |

(Continued)

FOREIGN PATENT DOCUMENTS

| | | |
|---|---|---|
| JP | 2002-012080 A | 1/2002 |
| JP | 2006-313312 A | 11/2006 |

(Continued)

OTHER PUBLICATIONS

Machine translation of JP2013134366.*
(Continued)

*Primary Examiner* — Kimberly N. Kakalec
(74) *Attorney, Agent, or Firm* — IP Business Solutions, LLC

(57) ABSTRACT

A technique for improving the visibility of images from an imaging device even in conditions such that waterdrops adhering on a surface of a lens is very small is provided. An imaging device 13 includes a camera 20 having a lens 23, in which a lens side hydrophilic layer 23a is applied on a surface of the lens 23, and being configured to be provided to a vehicle, and a waterdrop guiding part 21 which guides waterdrops that adhere on the vehicle to the lens 23.

18 Claims, 16 Drawing Sheets

(51) Int. Cl.
   *B60R 11/00*   (2006.01)
   *B60R 11/04*   (2006.01)
   *B60R 13/07*   (2006.01)
   *G02B 27/00*   (2006.01)
   *G03B 17/02*   (2006.01)
   *G03B 17/08*   (2006.01)

(52) U.S. Cl.
   CPC ............... *G02B 1/18* (2015.01); *G03B 17/02* (2013.01); *G03B 17/08* (2013.01); *B60R 2011/004* (2013.01); *B60R 2300/80* (2013.01)

(56) References Cited

U.S. PATENT DOCUMENTS

| | | | |
|---|---|---|---|
| 2008/0112050 A1 | 5/2008 | Nomura | |
| 2011/0073142 A1 | 3/2011 | Hattori et al. | |
| 2012/0117745 A1 | 5/2012 | Hattori et al. | |
| 2015/0185592 A1* | 7/2015 | Eineren | G03B 17/02 |
| | | | 348/375 |
| 2015/0296108 A1 | 10/2015 | Hayakawa et al. | |

FOREIGN PATENT DOCUMENTS

| | | |
|---|---|---|
| JP | 2008-148276 A | 6/2008 |
| JP | 2009-157194 A | 7/2009 |
| JP | 2010-060699 A | 3/2010 |
| JP | 2013-134366 A | 7/2013 |
| WO | 2014017405 A1 | 1/2014 |

OTHER PUBLICATIONS

European Office Action dated May 17, 2018 in the corresponding European patent application No. 14 882 289.3-1020.
Notice of Reasons for Refusal mailed by Japan Patent Office dated Dec. 26, 2017 in corresponding Japanese patent application No. 2014-026619.
Extended European Search Report mailed by European Patent Office dated Aug. 25, 2017 in the corresponding European patent application No. 14882289.3-1562.
International Search Report issued for corresponding PCT/JP2014/082970 application.
Written Opinion of the International Search Authority issued for corresponding PCT/JP2014/082970 application.
International Preliminary Report on Patentability issued for corresponding PCT/JP2014/082970 application.

* cited by examiner

IMAGING DEVICE AND WATERDROP GUIDING MEMBER

TECHNICAL FIELD

The present invention relates to an imaging device and a waterdrop guiding member.

BACKGROUND ART

In a vehicle mounted imaging device that may be used outdoors, a technique for improving the quality of imaged images by enhancing a water draining performance of a surface of a lens is known heretofore (for example, refer to Patent Literature 1). According to Patent Literature 1, a water-repellent coating is applied on a surface of a lens, and a hydrophilic coating is applied around the lens, whereby the performance of draining waterdrops that adhered on the surface of the lens is improved.

In another case, in an imaging device, a technique of applying a hydrophilic coating on a surface of a lens and providing a water draining pipe under the lens so as to drain waterdrops adhering on the lens by capillary phenomenon is publicly known (for example, refer to Patent Literature 2).

CITATION LIST

Patent Literature

Patent Literature 1: Japanese Unexamined Patent Application Laid-Open No. 2008-148276
Patent Literature 2: Japanese Unexamined Patent Application Laid-Open No. 2006-313312

SUMMARY OF INVENTION

Technical Problem

However, in Patent Literature 1, although the water-repellent coating is applied on the surface of the lens, when waterdrops adhering on the surface of the lens are very small, for example, in such a case when it is drizzling, waterdrops may not flow down by their own weights and may remain adhering on the lens. Therefore, the quality of images from the imaging device is degraded, and the images are difficult to visually recognize. On the other hand, in Patent Literature 2, although the hydrophilic coating is applied on the surface of the lens so that waterdrops will be hard to remain on the surface of the lens, when waterdrops adhering on the surface of the lens are very small, a nonuniform water film may be formed on the surface of the lens. Therefore, the quality of images from the imaging device is degraded, and the images are difficult to visually recognize.

The present invention has been completed in view of these circumstances, and an object of the present invention is to provide a technique for improving the visibility of images from an imaging device even in conditions such that waterdrops adhering on a surface of a lens are very small.

Solution to Problem

This specification contains all of the contents that are disclosed in Japanese Patent Application No. 2014-026619, filed on Feb. 14, 2014.

In order to achieve the above object, the present invention provides an imaging device including a camera having a lens, in which a hydrophilic surface treatment is applied on a surface of the lens, and a waterdrop guiding part that is configured to guide waterdrops to the lens.

In this structure, the waterdrop guiding part may be positioned over the lens and may be provided in contact with the lens.

Moreover, the waterdrop guiding part may be positioned over the lens and may include a groove or a protrusion for guiding the waterdrops to the lens.

The camera may be provided to a vehicle, and the waterdrop guiding part may include a vehicle side waterdrop guiding part which extends from the vehicle to the vicinity of a casing of the camera and include a casing side waterdrop guiding part that is provided to the casing.

Moreover, the camera may be tiltedly provided so that an optical axis will be directed obliquely downward, and the waterdrop guiding part may be configured to supply the waterdrops from above to the lens.

In a case in which the waterdrop guiding part has a tilt angle of less than 90 degrees relative to a horizontal plane H, a surface of the waterdrop guiding part may be provided with a water-repellent layer.

On the other hand, in a case in which the waterdrop guiding part has a tilt angle of not less than 90 degrees relative to the horizontal plane H, a surface of the waterdrop guiding part may be provided with a hydrophilic layer.

The waterdrop guiding part may include a waterdrop guiding plate which is arranged over the lens by making a lower edge of the waterdrop guiding plate close to the lens, and the waterdrop guiding plate may be tiltedly arranged relative to the horizontal plane.

The camera may be arranged under an eaves of the vehicle, and the lens may be arranged at an inner side of the vehicle than a lower edge portion of the eaves. In this case, the waterdrop guiding plate may be vertically extendingly provided so as to connect the lower edge portion of the eaves and the lens, and an upper edge of the waterdrop guiding plate may be arranged outer than an outer side of the lower edge portion so that a space will be formed between the upper edge of the waterdrop guiding plate and the lower edge portion of the eaves.

A water-repellent layer may be provided on an inside surface of the waterdrop guiding plate, or a hydrophilic layer may be provided on an outside surface of the waterdrop guiding plate, or both of the water-repellent layer and the hydrophilic layer may be provided.

The eaves may be a finishing panel which is mounted on an outer surface of a trunk lid in the rear side of the vehicle and which extends laterally, and the waterdrop guiding plate may be laterally extendingly arranged between the finishing panel and the lens.

Moreover, a lower edge of the waterdrop guiding plate may be formed with a gutter-like part that extends laterally, and the gutter-like part may be slanted so that waterdrops will flow in the gutter-like part to the lens.

The camera may include a water retaining part which protrudes from the vicinity of the lower edge of the lens in the approximately optical axis direction.

The present invention also provides a waterdrop guiding member configured to guide waterdrops that adhere on a vehicle to a lens of a camera, the camera has a lens that is applied with a hydrophilic surface treatment and is provided on the vehicle, and the waterdrop guiding member includes a groove or a protrusion that is provided over the lens so as to guide the waterdrops to the lens.

In this structure, the camera may be arranged under an eaves of the vehicle, the lens may be arranged at the inner side of the vehicle than a lower edge portion of the eaves, and the waterdrop guiding member may be arranged by making a lower edge portion of the waterdrop guiding member close to the lens.

In a case in which the waterdrop guiding member has a tilt angle of less than 90 degrees relative to a horizontal plane H, a water-repellent layer may be provided on a surface of the waterdrop guiding member.

On the other hand, in a case in which the waterdrop guiding member has a tilt angle of not less than 90 degrees relative to the horizontal plane H, a hydrophilic layer may be provided on a surface of the waterdrop guiding member.

The waterdrop guiding member may include a vehicle side waterdrop guiding part which extends from the vehicle to the vicinity of a casing of the camera and include a casing side waterdrop guiding part that is provided to the casing.

Moreover, the vehicle side waterdrop guiding part may include a waterdrop guiding plate which is tiltedly arranged relative to a horizontal plane H over the lens by making a lower edge of the waterdrop guiding plate close to the lens. In this waterdrop guiding plate, a water-repellent layer may be provided on a surface which has a tilt angle of less than 90 degrees relative to the horizontal plane H, and a hydrophilic layer may be provided on a surface which has a tilt angle of not less than 90 degrees relative to the horizontal plane H.

Advantageous Effects of Invention

According to the present invention, the visibility of images from the imaging device can be improved even in conditions such that waterdrops adhering on the surface of the lens are very small.

DESCRIPTION OF EMBODIMENTS

Hereinafter, embodiments of the present invention will be described with reference to figures.

First Embodiment

Figure 1:
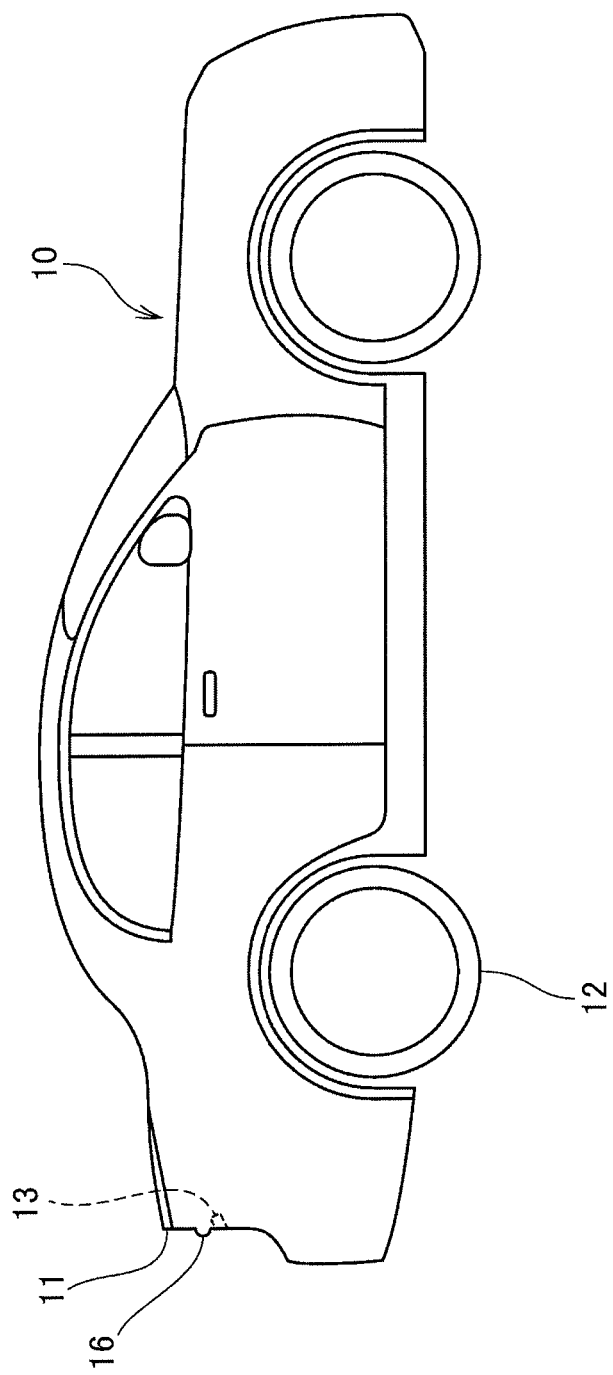
FIG. 1 shows aright side of a vehicle that is provided with a vehicle mounted imaging device according to a first embodiment of the present invention.

FIG. 1 is a right side view of a vehicle that is provided with a vehicle mounted imaging device according to a first embodiment of the present invention.

As shown in FIG. 1, a four-wheeled automobile 10 (vehicle) includes an openable and closeable trunk lid 11 in a rear side of the vehicle body behind a rear wheel 12, and the trunk lid 11 is provided with an imaging device 13 (vehicle mounted imaging device) for imaging a rear view of the automobile 10.

Figure 2:
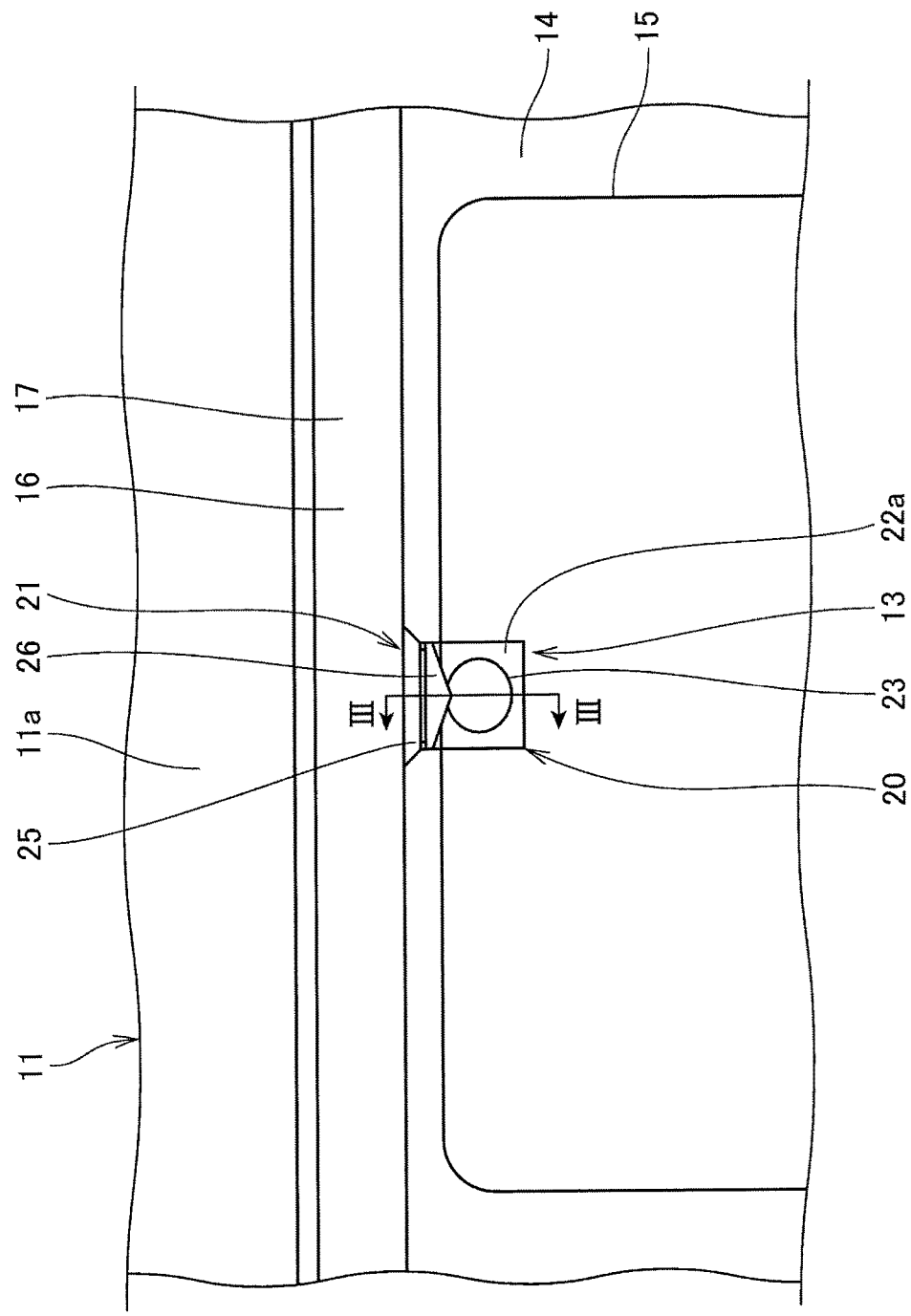
FIG. 2 shows a center portion of a trunk lid that is viewed from a rear side.

FIG. 2 shows a center portion of the trunk lid 11 that is viewed from the rear side.

As shown in FIG. 2, the trunk lid 11 includes a depressed part 14 at the center in the vehicle width direction, and the depressed part 14 is depressed toward the front side of the automobile 10 by one step and is mounted with a license plate 15 which has an approximately rectangular shape that is long in the vehicle width direction. The depressed part 14 is formed into an approximately rectangular shape in a rear view.

A finishing plate 16 which extends in the vehicle width direction is provided to an upper part 11a of the trunk lid 11 over the depressed part 14. The finishing plate 16 protrudes rearwardly by one step relative to a part of the trunk lid 11 surrounding the finishing plate 16, whereby a user or the like can hold the finishing plate 16 when the user opens or closes the trunk lid 11.

The finishing plate 16 is provided along an upper edge portion of the depressed part 14 and is formed into an eaves shape which rearwardly protrudes from the vicinity of the upper edge of the depressed part 14 in a side view. That is, the finishing plate 16 constitutes an eaves 17 which covers over the depressed part 14.

The imaging device 13 is provided at an upper portion within the depressed part 14 at the center in the vehicle width direction and is positioned under the eaves 17.

Figure 3:
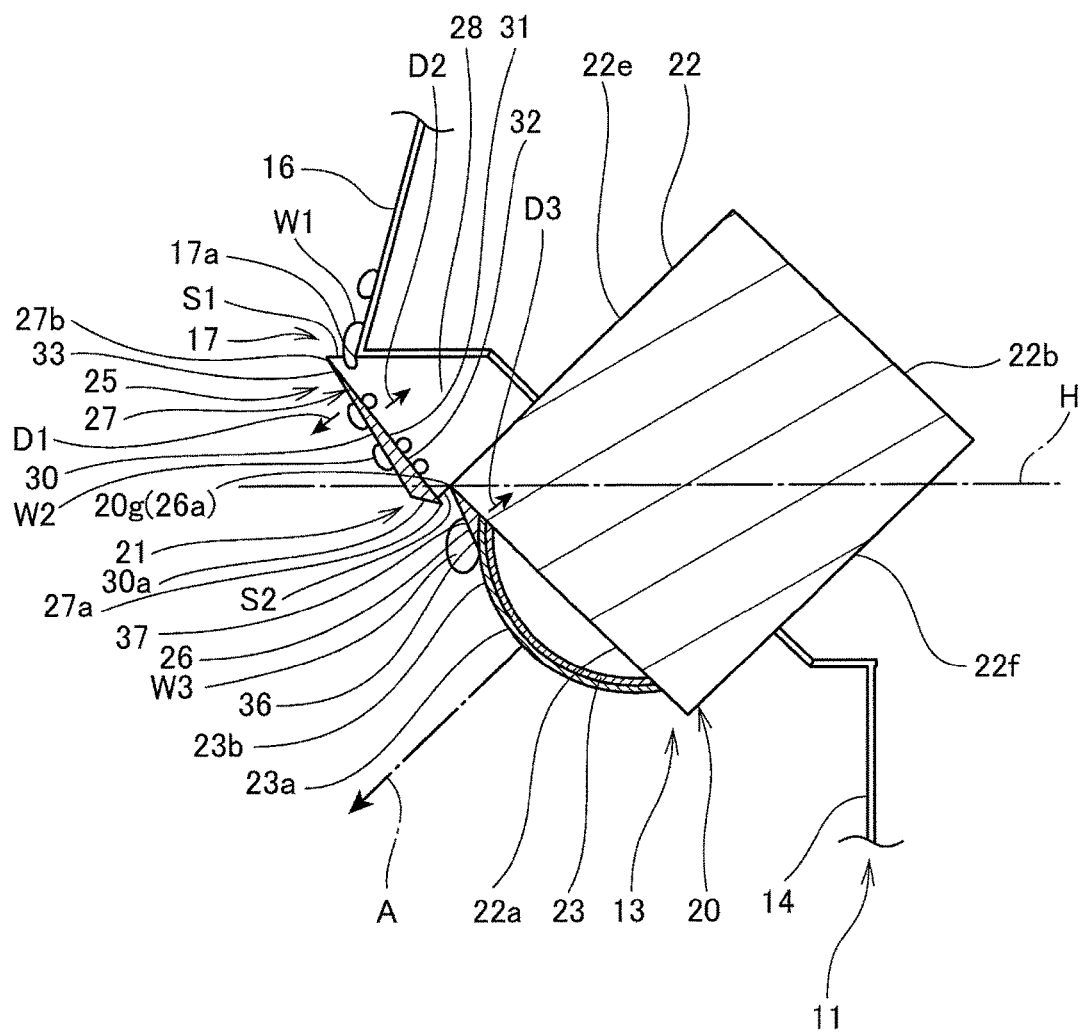
FIG. 3 is a sectional view taken along the line III-III in FIG. 2.
Figure 4:
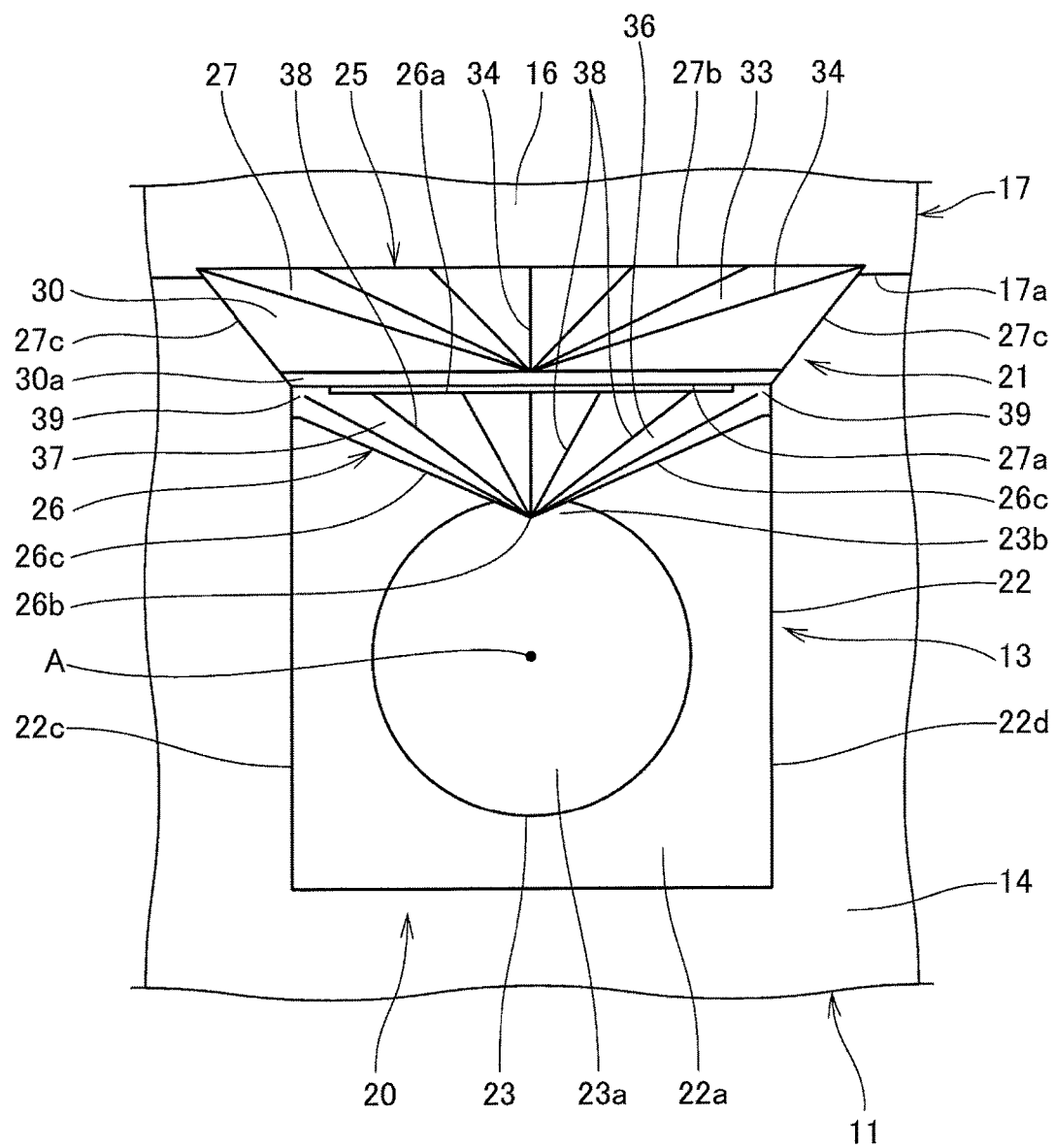
FIG. 4 shows an imaging device that is viewed from a rear side in an optical axis direction of the imaging device.

FIG. 3 is a sectional view taken along the line in FIG. 2. FIG. 4 shows the imaging device 13 that is viewed from the rear side in the optical axis direction of the imaging device 13.

The imaging device 13 includes a camera 20 that has an approximately box shape and includes a waterdrop guiding part 21 (waterdrop guiding member) for guiding waterdrops adhering on the automobile 10 to the camera 20.

The camera 20 includes a casing 22 that has an approximately box shape and includes a lens 23 which has a curved shape that is convexed toward the outside of the casing 22. The casing 22 houses an imaging element (not shown) and the like.

The casing 22 includes a lens mounting surface 22a to be provided with the lens 23, a back surface 22b which approximately faces the lens mounting surface 22a, side surfaces 22c and 22d in right and left sides, a top surface 22e, and a bottom surface 22f. When the camera 20 is viewed from the direction of an optical axis A of the lens 23, the lens mounting surface 22a is formed into an approximately rectangular shape, and the lens 23 is provided at the center portion of the lens mounting surface 22a. The optical axis A extends in an approximately normal direction of the lens mounting surface 22a. This embodiment is described by defining the lens mounting surface 22a as being in the front side of the camera 20.

The camera 20 is arranged in the trunk lid 11 such that a back part of the casing 22 is embedded into the trunk lid 11, and a front part and the lens 23 are exposed to the outside of the automobile 10.

The camera 20 images a rear downward view of the automobile 10 and is tiltedly provided so that the optical axis A and the lens mounting surface 22a will be directed to the rear downward direction of the automobile 10. Therefore, in the side view, the top surface 22e is tilted down toward the rear side in the vehicle longitudinal direction, and the lens mounting surface 22a is tilted toward the front side in the vehicle longitudinal direction. The lens mounting surface 22a can also be described as being tilted down toward the inner side of the vehicle. In this embodiment, the optical axis A is arranged so as to be tilted down toward the rear side at an angle of approximately 45 degrees relative to the horizontal plane H, and in an installation state, an upper end of the lens mounting surface 22a constitutes a rear end 20g of the camera 20. The rear end 20g is positioned over the lens 23 and protrudes to the rear side of the automobile 10 further than a rear end of the lens 23.

The camera 20 is arranged under the eaves 17, and the upper side of the camera 20 is covered by the eaves 17. Specifically, the camera 20 is arranged at the front side than an eaves lower edge portion 17a of the eaves 17 (lower edge portion of the eave part). That is, the rear end 20g and the lens 23 of the camera 20 are positioned, under the eaves 17, at an inner side direction of the automobile 10 than the eaves lower edge portion 17a. Therefore, the camera 20 is difficult to visually recognize from the outside and has substantially no effect on the appearance of the automobile 10. Here, the eaves lower edge portion 17a is a lower edge portion of the eaves 17 and is also a rear edge portion of the eaves 17.

The lens 23 is formed into an approximately circular shape in a front view. The lens 23 includes a lens side hydrophilic layer 23a having a hydrophilic characteristic on the entirety of the surface with the curved shape. The lens 23 is made of transparent glass, resin, or the like, and the lens side hydrophilic layer 23a is formed by performing a surface treatment (coating) on the surface of the lens 23.

In this embodiment, the lens side hydrophilic layer 23a is provided to the lens 23, and waterdrops are collected to the lens side hydrophilic layer 23a by the waterdrop guiding part 21, whereby a uniform water film is formed on the surface of the lens 23, and the visibility of the images from the camera 20 is improved.

The waterdrop guiding part 21 includes a vehicle side waterdrop guiding part 25 which extends from the eaves lower edge portion 17a side to the casing 22 side of the camera 20 and includes a casing side waterdrop guiding part 26 that is provided to the casing 22.

The vehicle side waterdrop guiding part 25 includes a plate-shaped waterdrop guiding plate member 27 (waterdrop guiding plate) and a pair of mounting plate parts 28 and 28 which extend from both right and left end portions of the waterdrop guiding plate part 27 toward the inner side direction of the automobile 10.

The vehicle side waterdrop guiding part 25 is fixed to the trunk lid 11 such that the mounting plate parts 28 and 28 are fixed so as to enter between the eaves 17 and the top surface 22e of the casing 22.

The waterdrop guiding plate part 27 is formed so as to be longer in the width direction than in the height direction of the camera 20 in the front view. Specifically, the waterdrop guiding plate part 27 is formed into an approximately trapezoidal shape in a front view as shown in FIG. 4 and includes a lower edge 27a that extends in the approximately horizontal direction, an upper edge 27b that is longer than the lower edge 27a, and side edges 27c and 27c that connect both ends of the lower edge 27a and the upper edge 27b. The length of the lower edge 27a is made so as to be approximately equal to the width of the lens mounting surface 22a, and the length of the upper edge 27b is made so as to be greater than the width of the lens mounting surface 22a. Therefore, waterdrops are collected from a wide area through the upper edge 27b that is longer than the width of the lens mounting surface 22a, whereby a great amount of waterdrops are collected.

As shown in FIG. 3, the waterdrop guiding plate part 27 is formed into a plate shape which is to be arranged in a condition of being tilted down toward the front side in the vehicle longitudinal direction, and the waterdrop guiding plate part 27 is arranged so as to connect the eaves 17 and the rear end 20g of the camera 20.

Specifically, the upper edge 27b is arranged at approximately the same height as the eaves lower edge portion 17a and is also arranged at the rear side of the eaves lower edge portion 17a with a space S1 from the eaves lower edge portion 17a. The lower edge 27a is arranged at approximately the same height as the rear end 20g of the camera 20 and is also arranged at the rear side of the rear end 20g with a space S2 from the rear end 20g.

The waterdrop guiding plate part 27 has an outside surface 30 which is exposed to the outside of the automobile 10 and has an inside surface 31 which faces the inner side of the automobile 10 and which is under the eaves 17. The outside surface 30 is a lower surface of the waterdrop guiding plate part 27, and the inside surface 31 is a back surface of the outside surface 30 and is also an upper surface of the waterdrop guiding plate part 27.

A waterdrop W1 which adheres on the finishing plate 16 flows down through the space S1 to the inside surface 31 and then passes through the space S2 down to the lens 23 side. A waterdrop W2 which adheres on the outside surface 30 by being dispersed from a road surface, etc., flows along the outside surface 30 down to the lens 23 side.

The inside surface 31 has a tilt angle of less than 90 degrees relative to the horizontal plane H when the inside surface 31 is viewed from the adhering direction D1 of the waterdrop W1 relative to the inside surface 31, and a water-repellent layer 32 is formed on the entirety of the inside surface 31. The waterdrop W1 that adheres on the inside surface 31 flows down such that the waterdrop W1 rolls on the water-repellent layer 32.

The outside surface 30 has a tilt angle of not less than 90 degrees relative to the horizontal plane H when the outside surface 30 is viewed from the adhering direction D2 of the waterdrop W2 relative to the outside surface 30, and a hydrophilic layer 33 is formed on the entirety of the outside surface 30. The waterdrop W2 that adheres on the outside surface 30 flows down along the surface of the hydrophilic layer 33.

That is, in this embodiment, in the waterdrop guiding plate part 27, the water-repellent layer 32 is formed at a portion having a tilt angle of less than 90 degrees, on which waterdrops flow such that the waterdrops roll down on a slope. On the other hand, in the waterdrop guiding plate part 27, the hydrophilic layer 33 is formed at a portion which has a tilt angle of not less than 90 degrees and which has a slope that is overhanged with respect to waterdrops, so that the waterdrops will flow down along the slope.

The outside surface 30 includes a lower end slope 30a at the lower end of the outside surface 30, and the lower end slope 30a is overhanged by a degree that is greater than the overhanged degree of the upper portion.

It should be noted that the hydrophilic characteristic is defined as a characteristic by which a contact angle with respect to water is not greater than 40 degrees, and the water repellency is defined as a characteristic by which the contact angle with respect to water is greater than 40 degrees. In this embodiment, the contact angle with respect to water is preferably not greater than 20 degrees in the hydrophilic layer 33, and the contact angle with water is preferably not less than 60 degrees in the water-repellent layer 32.

Figure 5A:
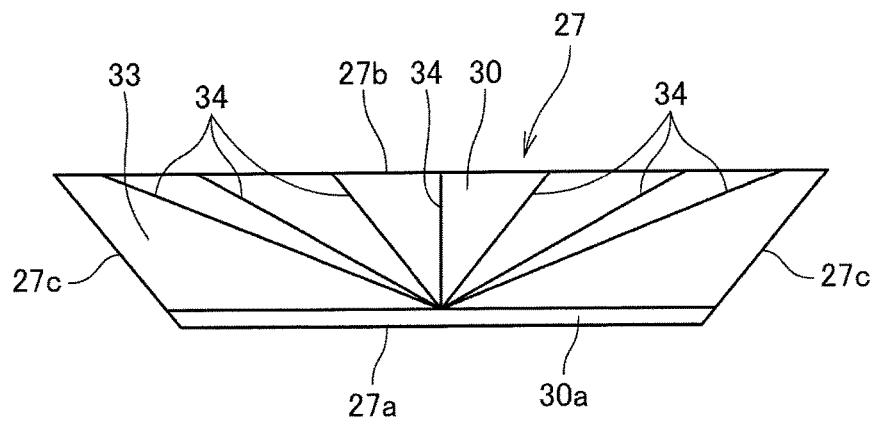
FIG. 5A is a front view showing an outside surface of a waterdrop guiding plate part.
Figure 5B:
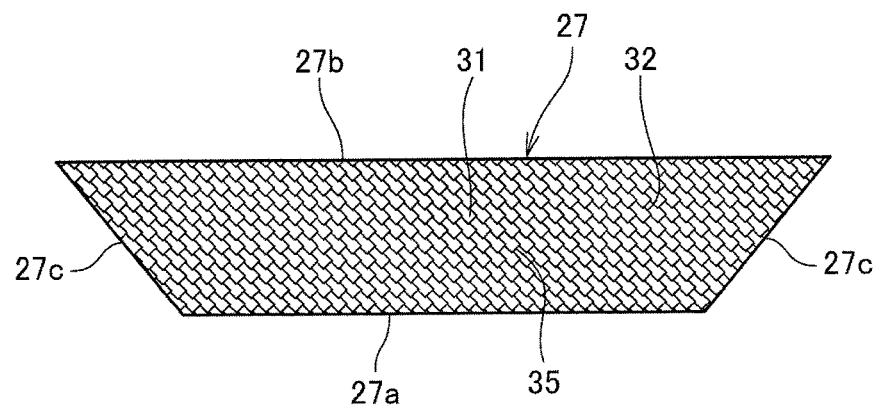
FIG. 5B is a front view showing an inside surface of the waterdrop guiding plate part.

FIG. 5A is a front view showing the outside surface 30 of the waterdrop guiding plate part 27, and FIG. 5B is a front view showing the inside surface 31 of the waterdrop guiding plate part 27.

As shown in FIG. 5A, multiple linear grooves 34 which extend from the upper edge 27b side to the lower edge 27a are formed in the outside surface 30. The grooves 34 are arranged so as to be separated from each other at predetermined spaces in the width direction in the upper edge 27b side but meet at a portion of the center portion of the waterdrop guiding plate part 27 in the width direction in the lower edge 27a side. The waterdrop W2 flowing through the outside surface 30 flows along the groove 34 and is collected at the center portion in the lower edge 27a side. Alternatively, a protrusion may be provided instead of the groove 34 at the same position as the groove 34. Also, in this case, the waterdrop W2 is collected at the center portion of the waterdrop guiding plate part 27 in the width direction along the protrusion. The waterdrop W2, which adheres on the outside surface 30 by being dispersed from a road surface, is a small particle, but the particle of the waterdrop W2 can be enlarged by collecting waterdrops by the multiple grooves 34 as in this embodiment, whereby the waterdrop W2 adhering on the outside surface 30 is efficiently made to flow down.

As shown in FIG. 5B, a mesh-like water path 35 is formed on the entirety of the inside surface 31. The water path 35 is formed of grooves, rib-like protrusions, or the like. The waterdrop W1, which flows along the exterior of the automobile 10, such as the finishing plate 16 and the like, is a large particle, and therefore, it is anticipated that the waterdrop W1 flows down at a time. Nevertheless, in this embodiment, by providing the mesh-like water path 35, the water path 35 obstructs the flow of the waterdrop W1 and makes the waterdrop W1 flow uniformly, and the amount of water flowing down along the inside surface 31 is stabilized.

As shown in FIGS. 3 and 4, the casing side waterdrop guiding part 26 is a plate member to be mounted on the lens mounting surface 22a over the lens 23. The casing side waterdrop guiding part 26 is formed into an approximately triangle shape, in which a side in the rear end 20g side of the camera 20 is an approximately horizontal upper side, and which protrudes to the lens 23, in the front view. The casing side waterdrop guiding part 26 has an upper edge 26a along the rear end 20g and side edges 26c and 26c which downwardly extend from both ends of the upper edge 26a and meet at a lower end 26b that is the top point.

The lower end 26b of the casing side waterdrop guiding part 26 is provided in contact with the surface of an upper portion 23b of the circular lens 23. Specifically, in the width direction of the lens 23, the lower end 26b contacts the upper portion 23b of the lens 23 at the center of the lens 23. The center of the lens 23 is arranged at a position that approximately corresponds to the position of the optical axis A. The area of the lower end 26b overlapping the lens 23 is outside of the area of the image which is output from the camera 20 and which is displayed on a monitor (not shown) in the vehicle, and the lower end 26b is not displayed on the monitor.

The upper edge 26a of the casing side waterdrop guiding part 26 is positioned at the same height as the lower edge 27a of the waterdrop guiding plate part 27 and is arranged at the inner side of the automobile 10 than the lower edge 27a. Specifically, the upper edge 26a is arranged at a position that approximately corresponds to the position of the rear end 20g and is separated from the lower edge 27a by the space S2.

An outer surface 36 of the casing side waterdrop guiding part 26 has a tilt angle of not less than 90 degrees relative to the horizontal plane when the outer surface 36 is viewed from the adhering direction D3 of a waterdrop W3 relative to the outer surface 36, and a casing side hydrophilic layer 37 having a hydrophilic characteristic is formed on the entirety of the outer surface 36. The outer surface 36 is overhanged by a degree of less than the overhanged degree of the lens mounting surface 22a. The waterdrop W3 adhering on the outer surface 36 flows down along the casing side hydrophilic layer 37.

As shown in FIG. 4, the outer surface 36 of the casing side waterdrop guiding part 26 is formed with multiple linear grooves 38 which extend from the upper edge 26a side to the lower end 26b. The grooves 38 are arranged so as to be separated from each other at predetermined spaces in the width direction in the upper edge 26a side but meet at a portion of the center portion of the lower end 26b in the width direction in the lower end 26b side. The waterdrop W3 flowing through the outer surface 36 flows along the groove 38 and is collected at the lower end 26b in the downstream side. Alternatively, a protrusion may be provided instead of the groove 34 at the same position as the groove 34. Also, in this case, the waterdrop W3 is collected at the lower end 26b along the protrusion.

The casing side waterdrop guiding part 26 is integrally connected to the lower edge 27a of the waterdrop guiding plate part 27 by a pair of connecting portions 39 and 39 which are provided to both ends of the upper edge 26a. Therefore, the space S2 is easily formed with high precision.

Here, the mechanism of the formation of a water film on the surface of the lens 23 by the waterdrops that are guided to the waterdrop guiding part 21 is described.

A part amount of waterdrops which adhere on the automobile 10 and which flow to the rear part of the automobile 10, such as rains, flow from the trunk lid 11 toward the finishing plate 16 side, and a waterdrop W1 which flows down along the surface of the center portion of the finishing plate 16 flows through the space S1 to the inside surface 31 of the waterdrop guiding plate part 27. The waterdrop W1 flows down such that the waterdrop W1 rolls on the water-repellent layer 32 and reaches the outer surface 36 of the casing side waterdrop guiding part 26 through the space S2.

On the other hand, a waterdrop W2 which adheres on the outside surface 30 by being dispersed from a road surface by the rear wheel 12 or the like flows down along the hydrophilic layer 33 and reaches the outer surface 36 of the casing side waterdrop guiding part 26 from the lower end slope 30a. The waterdrops W1 and W2 that reached the outer surface 36 meet together and form a waterdrop W3, and the waterdrop W3 flows along the casing side hydrophilic layer 37 from the lower end 26b to the upper portion 23b of the lens 23. The waterdrop W3 that reached the upper portion 23b flows down on the lens side hydrophilic layer 23a while the waterdrop W3 spreads in the width direction of the lens 23, thereby forming an approximately uniform water film on the entirety of the lens 23. Since the lens 23 is formed with the lens side hydrophilic layer 23a, the waterdrop easily spreads over the surface of the lens 23, and an approximately uniform water film is effectively formed.

As described above, according to the first embodiment, in which the present invention is applied, the imaging device 13 includes the camera 20 which has the lens 23, in which the lens 23 is applied with the lens side hydrophilic layer 23 on the surface of the lens 23, and which is to be mounted on the automobile 10, and the waterdrop guiding part 21 which guides the waterdrops W1 and W2 adhering on the automobile 10 to the lens 23. Therefore, the waterdrops adhering on the automobile 10, such as rains, are guided to the surface of the lens 23 that is applied with the lens side hydrophilic layer 23a, by the waterdrop guiding part 21, whereby an approximately uniform water film is formed on the surface of the lens 23. Accordingly, an approximately uniform water film is formed on the surface of the lens 23 even in conditions such that waterdrops adhering on the surface of the lens 23 are very small, for example, in a condition in which a drizzle or the like is falling, whereby the visibility of the images from the imaging device 13 is improved.

Since the waterdrop guiding part 21 is positioned over the lens 23 and is provided in contact with the lens 23, the waterdrop W3 flowing down from above to the lens 23 side is directly guided to the lens 23 by the waterdrop guiding part 21 that contacts the lens 23, whereby an approximately uniform water film is effectively formed on the surface of the lens 23.

Since the waterdrop guiding part 21 includes the grooves 34 and 38 that are positioned over the lens 23 and that guide the waterdrops to the lens 23, the waterdrops flowing down from above to the lens 23 side are efficiently guided to the lens 23 by the grooves 34 and 38, whereby an approximately uniform water film is effectively formed on the surface of the lens 23.

Moreover, since the waterdrop guiding part 21 includes the vehicle side waterdrop guiding part 25 which extends from the automobile 10 to the vicinity of the casing 22 of the camera 20 and includes the casing side waterdrop guiding part 26 that is provided to the casing 22, the waterdrops adhering on the automobile 10 are guided to the vicinity of the casing 22 of the camera 20 by the vehicle side waterdrop guiding part 25 and are then guided to the lens 23 by the casing side waterdrop guiding part 26.

The camera 20 is tiltedly provided so that the optical axis A will be directed obliquely downward, and the waterdrop guiding part 21 supplies the waterdrops from above to the lens 23, whereby a water film is effectively formed on the surface of the lens 23 even though the camera has the optical axis A which is directed obliquely downward.

In the case inwhich the inside surface 31 of the waterdrop guiding part 21 has a tilt angle of less than 90 degrees relative to the horizontal plane H, the water-repellent layer 32 is provided on the surface of the inside surface 31. Therefore, W1 quickly flows on the surface of the water-repellent layer 32 and is guided to the lens 23. Accordingly, a water film is effectively formed on the surface of the lens 23.

On the other hand, in the case in which the tilt angle of each of the outside surface 30 and the outer surface 36 is not less than 90 degrees relative to the horizontal plane in the waterdrop guiding part 21, the hydrophilic layer 33 and the casing side hydrophilic layer 37 are respectively provided on the surfaces of the outside surface 30 and the outer surface 36. Therefore, even in a structure in which the waterdrops are difficult to flow along the surfaces because the tilt angle of each of the outside surface 30 and the outer surface 36 is not less than 90 degrees relative to the horizontal plane, the waterdrops are made to flow on the hydrophilic outside surface 30 and the hydrophilic outer surface 36 and are guided to the lens 23. Accordingly, a water film is effectively formed on the surface of the lens 23.

Furthermore, the waterdrop guiding part 21 includes the waterdrop guiding plate part 27 which is arranged over the lens 23 by making the lower edge 27a close to the lens 23, and the waterdrop guiding plate part 27 is tiltedly arranged relative to the horizontal plane H. Therefore, both the waterdrop W1 and the waterdrop W2 flowing along the inside surface 31 and the outside surface 30 of the waterdrop guiding plate part 27 to the lower edge 27a side are guided to the surface of the lens 23, whereby a water film is effectively formed on the surface of the lens 23.

The camera 20 is arranged under the eaves 17 of the automobile 10, and the lens 23 is arranged at the inner side of the automobile 10 than the eaves lower edge portion 17a of the eaves 17. The waterdrop guiding plate part 27 is vertically extendingly provided so as to connect the eaves lower edge portion 17a and the lens 23, and the upper edge 27b of the waterdrop guiding plate part 27 is arranged outer than an outer side of the eaves lower edge portion 17a so that the space S1 is formed between the upper edge 27b and the eaves lower edge portion 17a. Thus, the waterdrop W1 flowing down on the eaves 17 is made to flow through the space S1 to the inside surface 31 of the waterdrop guiding plate part 27 and is guided to the surface of the lens 23. Also, the waterdrop W2 that adheres on the outside surface 30 of the waterdrop guiding plate part 27 from the outside of the automobile 10 is made to flow along the outside surface 30 of the waterdrop guiding plate part 27 and is guided to the surface of the lens 23. Accordingly, a water film is effectively formed on the surface of the lens 23.

The waterdrop guiding plate part 27 includes the water-repellent layer 32 that is provided on the inside surface 31 of the waterdrop guidingplatepart 27 and includes the hydrophilic layer 33 that is provided on the outside surface 30 of the waterdrop guiding plate part 27. Therefore, the waterdrop that is guided to the space S1 is made to quickly flow on the water-repellent layer 32 and is guided to the lens 23. Also, the waterdrop W2 that adheres on the outside surface 30 of the waterdrop guiding plate part 27 from the outside of the automobile 10 is made to flow along the hydrophilic layer 33 and is guided to the lens 23. It should be noted that at least one of the water-repellent layer 32 and the hydrophilic layer 33 may be provided.

The eaves 17 is the finishing plate 16 which is mounted on the outer surface of the trunk lid 11 in the rear side of the vehicle 10 and which extends laterally, and the waterdrop guiding plate part 27 is laterally extendingly arranged between the finishing plate 16 and the lens 23. Therefore, the waterdrops adhering on the trunk lid 11 and the finishing plate 16 are guided to the lens 23 via the waterdrop guiding plate part 27. Also, the waterdrops that adhere on the outside surface 30 of the waterdrop guiding plate part 27 from the outside of the automobile 10 are guided to the lens 23.

Second Embodiment

Hereinafter, the second embodiment, in which the present invention is applied, is described with reference to FIGS. 6 and 7. In the second embodiment, the parts which are constructed in the same manner as in the first embodiment are represented by the same reference symbols as the parts in the first embodiment, and descriptions for the parts are omitted.

The second embodiment differs from the first embodiment in that a waterdrop guiding plate part 127 (waterdrop guiding member) is provided instead of the waterdrop guiding plate part 27, and the waterdrop guiding plate part 127 is longer than the waterdrop guiding plate part 27 in the width direction and includes an outside gutter-like portion 140 and an inside gutter-like portion 141 for collecting waterdrops.

Figure 6:
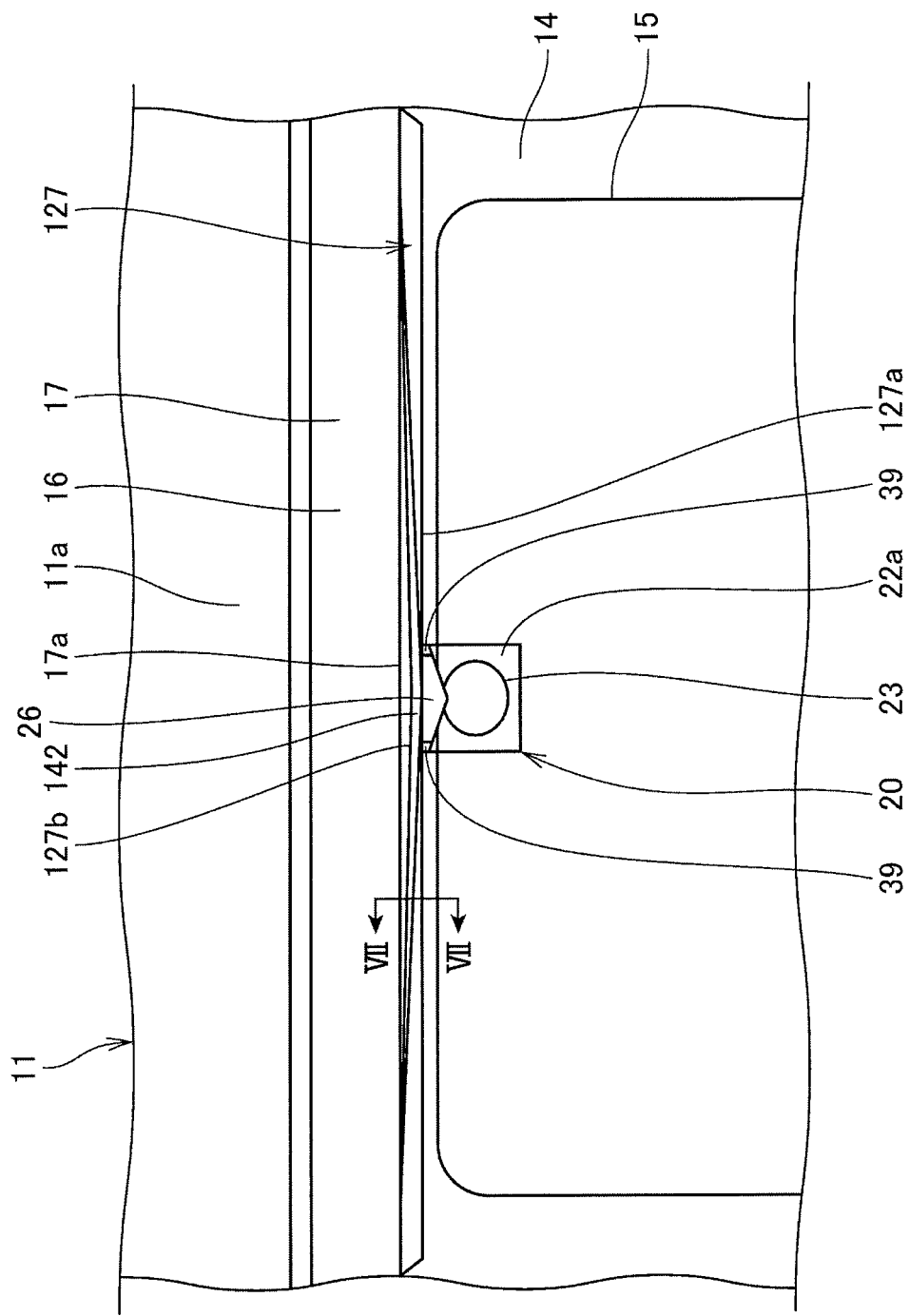
FIG. 6 shows a center portion of a trunk lid in a second embodiment, which is viewed from a rear side.
Figure 7:
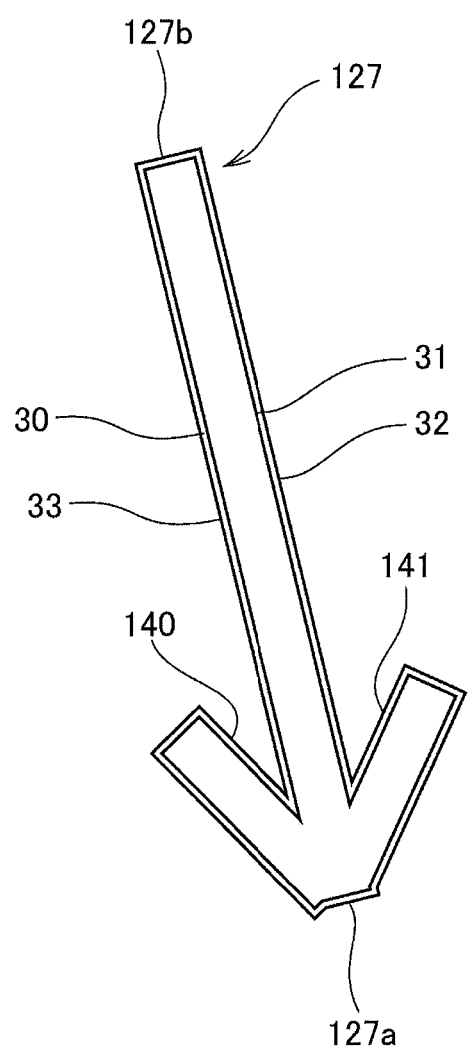
FIG. 7 is a sectional view taken along the line VII-VII in FIG. 6.

FIG. 6 shows the center portion of the trunk lid 11 in the second embodiment, which is viewed from the rear side. FIG. 7 is a sectional view taken along the line VII-VII in FIG. 6.

As shown in FIG. 6, the waterdrop guiding plate part 127 is formed so as to be longer than the license plate 15 in the width direction.

An upper edge 127b of the waterdrop guiding plate part 127 is arranged at a position that is approximately the same height as the eaves lower edge portion 17a and is also arranged at the rear side of the eaves lower edge portion 17a with the space S1 (FIG. 3) from the eaves lower edge portion 17a. On the other hand, a lower edge 127a of the waterdrop guiding plate part 127 is arranged at approximately the same height as the rear end 20g of the camera 20 and is also arranged at the rear side of the rear end 20g with the space S2 (FIG. 3) from the rear end 20g.

As shown in FIG. 7, the lower edge 127a of the waterdrop guiding plate part 127 is formed with the outside gutter-like portion 140 which is provided on the outside surface 30 and the inside gutter-like portion 141 which is provided on the inside surface 31. It should be noted that the outside gutter-like portion 140 and the inside gutter-like portion 141 are not illustrated in FIG. 6.

The outside gutter-like portion 140 and the inside gutter-like portion 141 are formed over approximately the entire width of the waterdrop guiding plate part 127. The outside gutter-like portion 140 and the inside gutter-like portion 141 are slantly provided so as to be at the lowest height at a center 142 of the waterdrop guiding plate part 127 in the width direction immediately above the lens 23.

Moreover, the waterdrop guiding plate part 127 includes multiple grooves or multiple protrusions (not shown) which extend from the upper edge 127b side to the center portion of the lower edge 127a in the width direction, and waterdrops flow on the waterdrop guiding plate part 127 along the grooves or the protrusions and gather at the center portion.

A great amount of waterdrops flowing down on the trunk lid 11 flow to the waterdrop guiding plate part 127 that is formed so as to be longer than the license plate 15 in the width direction. Then, the waterdrops flow on the inside surface 31 and reach the inside gutter-like portion 141, and the waterdrops flow along the inside gutter-like portion 141 to the center portion 142 and flow down from the center portion 142. Thereafter, the waterdrops flow on the casing side waterdrop guiding part 26 and reach the lens 23, thereby forming a water film on the surface of the lens 23. On the other hand, the waterdrops flowing down on the outside surface 30 flow along the outside gutter-like portion 140 to the center portion 142 and flow down from the center portion 142 to the lens 23 at the lower side.

According to the second embodiment, the lower edge 127a of the waterdrop guiding plate part 127 is formed with the outside gutter-like portion 140 and the inside gutter-like portion 141, which extend laterally, and the outside gutter-like portion 140 and the inside gutter-like portion 141 are slanted so that the waterdrops flowing on the outside gutter-like portion 140 and the inside gutter-like portion 141 will flow to the lens 23. Therefore, although the waterdrop guiding plate part 127 is long in the lateral direction (width direction), the waterdrops are guided to the lens 23 via the outside gutter-like portion 140 and the inside gutter-like portion 141, whereby a water film is efficiently formed on the lens 23.

Third Embodiment

Hereinafter, the third embodiment, in which the present invention is applied, is described with reference to FIGS. 8 and 9. In the third embodiment, the parts which are constructed in the same manner as in the first embodiment are represented by the same reference symbols as the parts in the first embodiment, and descriptions for the parts are omitted.

The third embodiment differs from the first embodiment in that a vehicle side waterdrop guiding part 227, in which waterdrops flow only on an outside surface 230, is provided instead of the waterdrop guiding plate part 27, in which the waterdrops flow on both the inside surface 31 and the outside surface 30.

Figure 8:
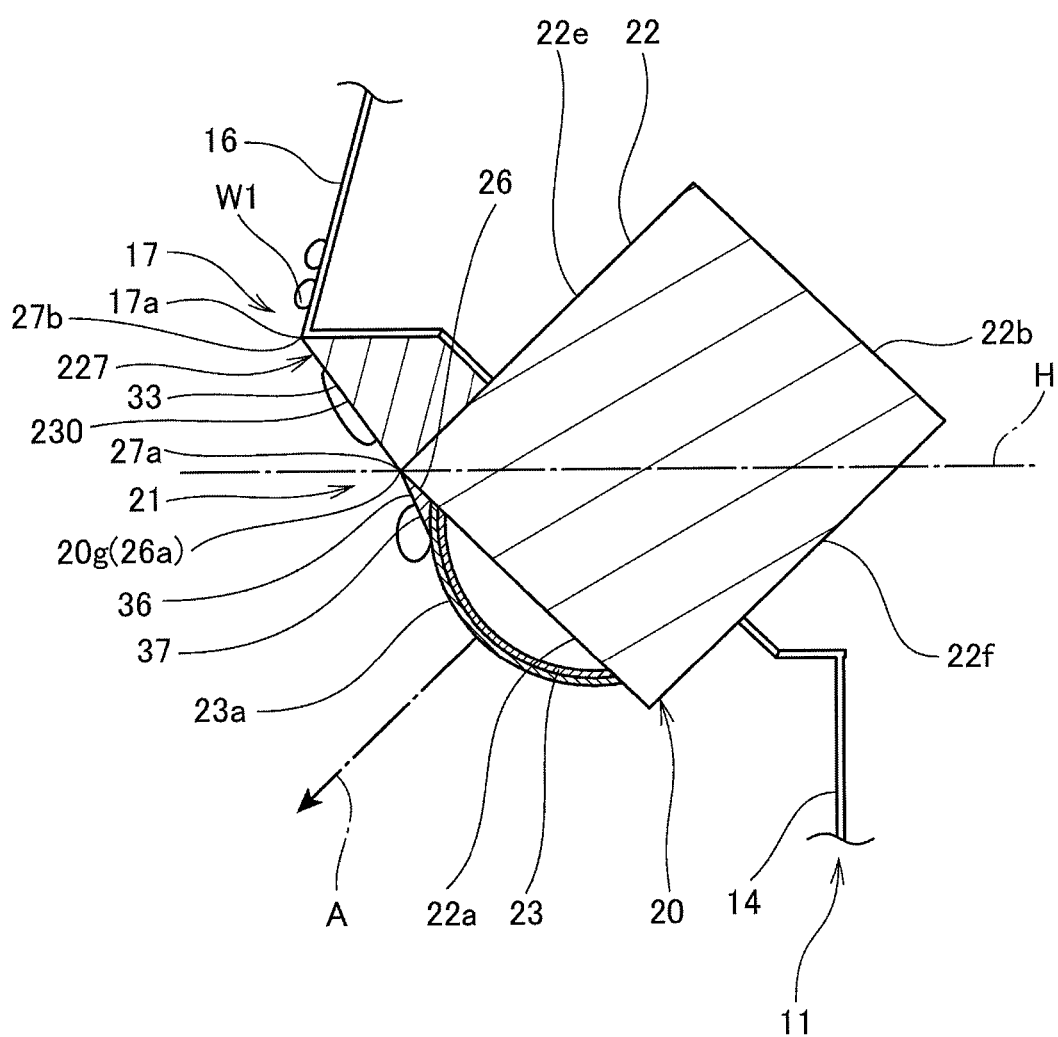
FIG. 8 is a sectional view taken along the line III-III in FIG. 2 according to a third embodiment.
Figure 9:
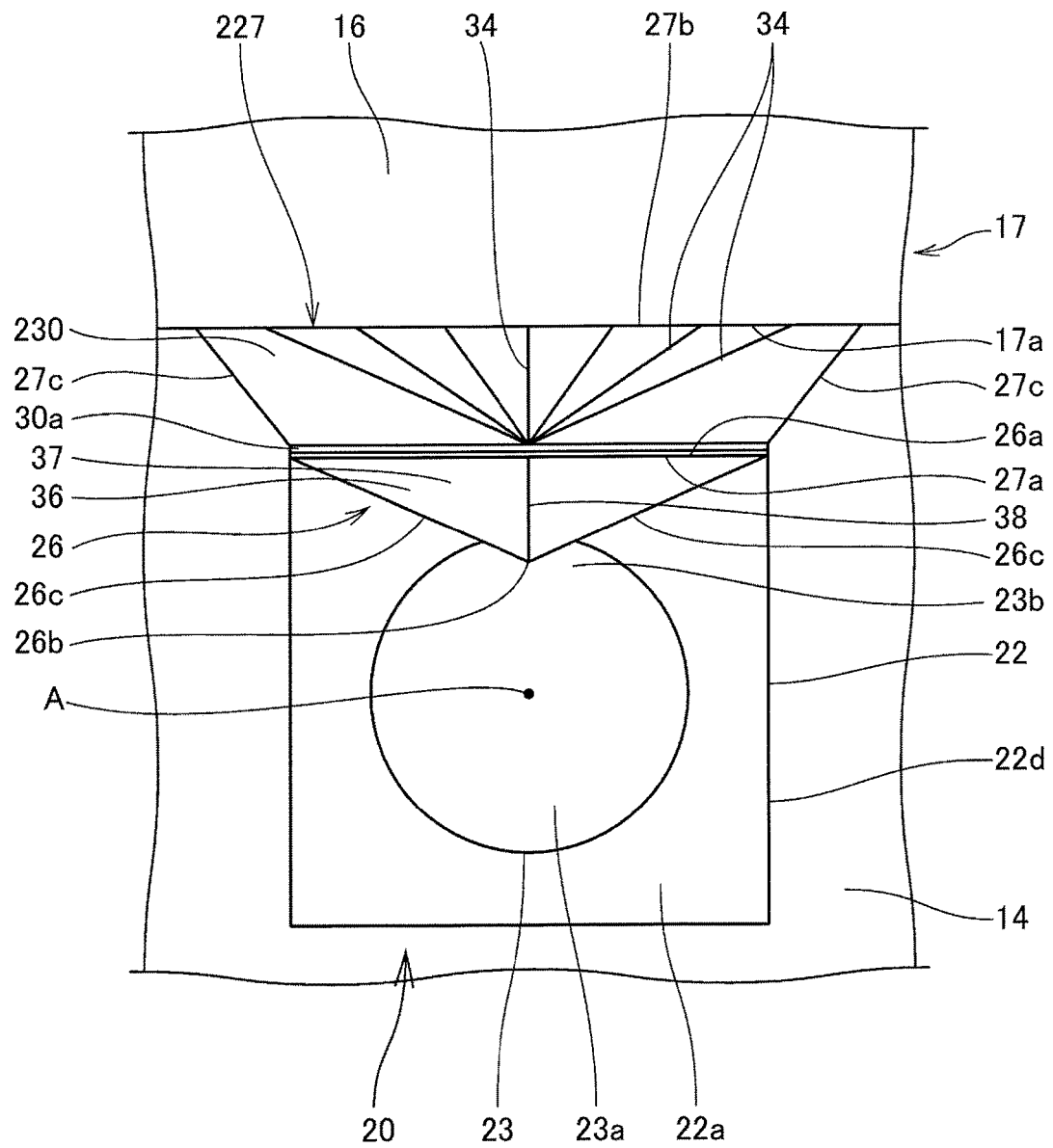
FIG. 9 shows a camera that is viewed from a rear side in an optical axis direction.

FIG. 8 is a sectional view taken along the line III-III in FIG. 2 according to the third embodiment. FIG. 9 shows the camera 20 that is viewed from the rear side in the optical axis direction of the camera 20.

The vehicle side waterdrop guiding part 227 is arranged in a condition of being tilted down toward the front side in the vehicle longitudinal direction and includes the outside surface 230 which is to be arranged so as to connect the eaves 17 and the rear end 20g of the camera 20. The outside surface 230 has the hydrophilic layer 33. It should be noted that the outside surface 230 has approximately the same shape as the outside surface 30 in the front view, and therefore, the portions which are constructed in the same manner as in the outside surface 30 are represented by the same reference symbols as the portions of the outside surface 30.

Specifically, the outside surface 230 is provided such that the upper edge 27b is connected to the eaves lower edge portion 17a and that the lower edge 27a is connected to the rear end 20g of the camera 20. The outside surface 230 has the hydrophilic layer 33.

The waterdrop W1 flows from the finishing plate 16 along the hydrophilic layer 33 of the outside surface 230 and reaches the casing side waterdrop guiding part 26, and the waterdrop W1 is guided to the lens 23 along the outer surface 36. On the other hand, the waterdrop that adheres on the outside surface 230 by being dispersed from a road surface by the rear wheel 12 or the like is also guided to the lens 23 along the outer surface 36. Therefore, a water film is effectively formed on the surface of the lens 23.

It should be noted that the vehicle side waterdrop guiding part 227 may have a plate shape or a block shape.

In addition, in the third embodiment, the connecting portions 39 and 39 are not provided, and the vehicle side waterdrop guiding part 227 and the casing side waterdrop guiding part 26 are provided independently of each other.

Fourth Embodiment

Hereinafter, the fourth embodiment, in which the present invention is applied, is described with reference to FIG. 10. In the fourth embodiment, the parts which are constructed in the same manner as in the first embodiment are represented by the same reference symbols as the parts in the first embodiment, and descriptions for the parts are omitted.

The first embodiment is described by providing both the waterdrop guiding plate part 27 and the casing side waterdrop guiding part 26. However, in the fourth embodiment, the casing side waterdrop guiding part 26 is not provided, and only a vehicle side waterdrop guiding part 327 is provided.

Figure 10:
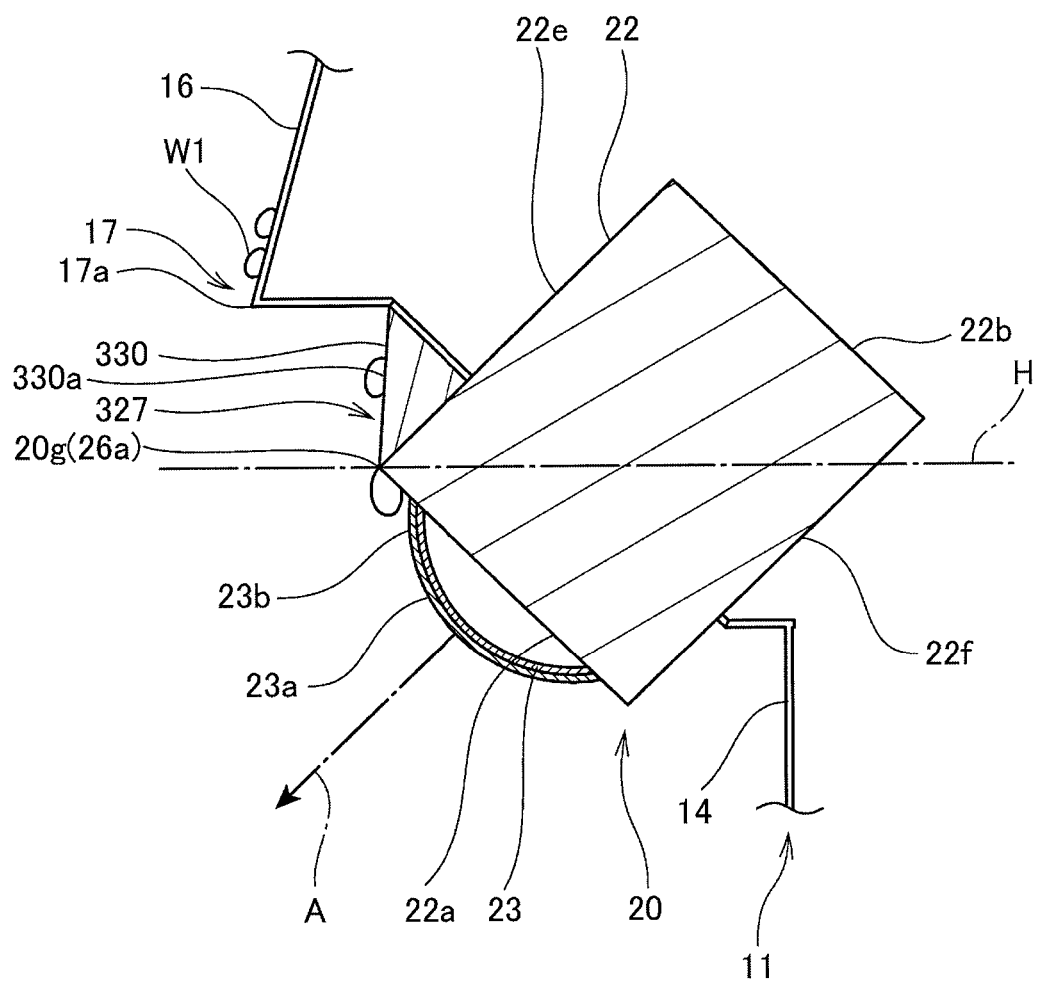
FIG. 10 is a sectional view taken along the line III-III in FIG. 2 according to a fourth embodiment.

FIG. 10 is a sectional view taken along the line III-III in FIG. 2 according to the fourth embodiment.

The vehicle sidewaterdrop guidingpart 327 (waterdrop guiding member) has an outside surface 330 which exposes to the outside of the automobile 10 under the eaves 17. The outside surface 330 is arranged such that an upper edge of the outside surface 330 is connected to the lower surface of the eaves 17 and that a lower edge of the outside surface 330 is connected from above to the rear end 20g of the camera 20. The outside surface 330 has a tilt angle of less than 90 degrees relative to the horizontal plane H when the outside surface 330 is viewed from the adhering direction of the waterdrop relative to the outside surface 330, and the outside surface 330 is formed with a water-repellent layer 330a.

The waterdrop adhering on the outside surface 330 flows down along the water-repellent layer 330a and flows to the lens 23 along the upper portion of the lens mounting surface 22a, thereby forming a water film on the surface of the lens 23.

It should be noted that the outside surface 330 may be provided so that the upper edge of the outside surface 330 will be connected to the eaves lower edge portion 17a. In this case, since the tilt angle of the outside surface 330 is not less than 90 degrees relative to the horizontal plane H, a hydrophilic layer is formed on the outside surface 330.

Fifth Embodiment

Hereinafter, the fifth embodiment, in which the present invention is applied, is described with reference to FIGS. 11 and 12. In the fifth embodiment, the parts which are constructed in the same manner as in the first embodiment are represented by the same reference symbols as the parts in the first embodiment, and descriptions for the parts are omitted.

Figure 11:
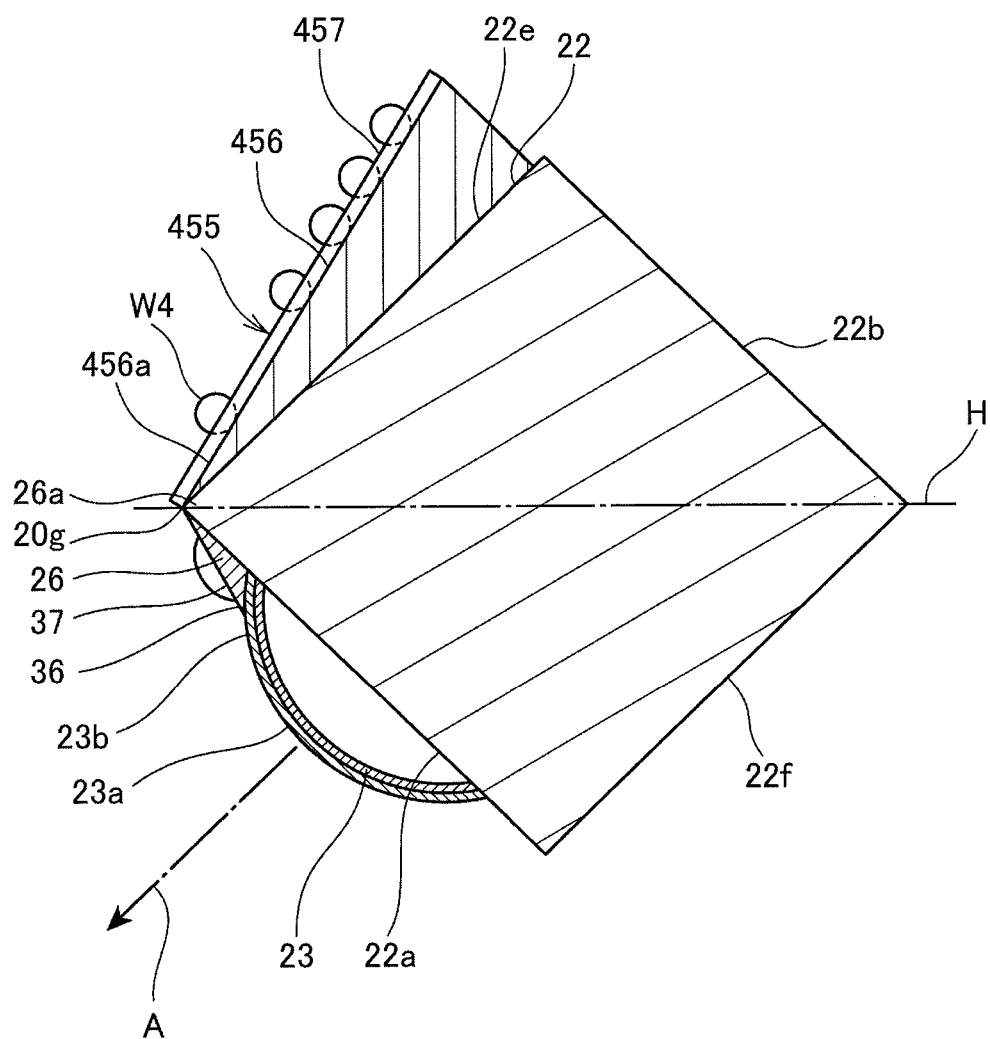
FIG. 11 is a sectional view of a camera in a fifth embodiment.
Figure 12:
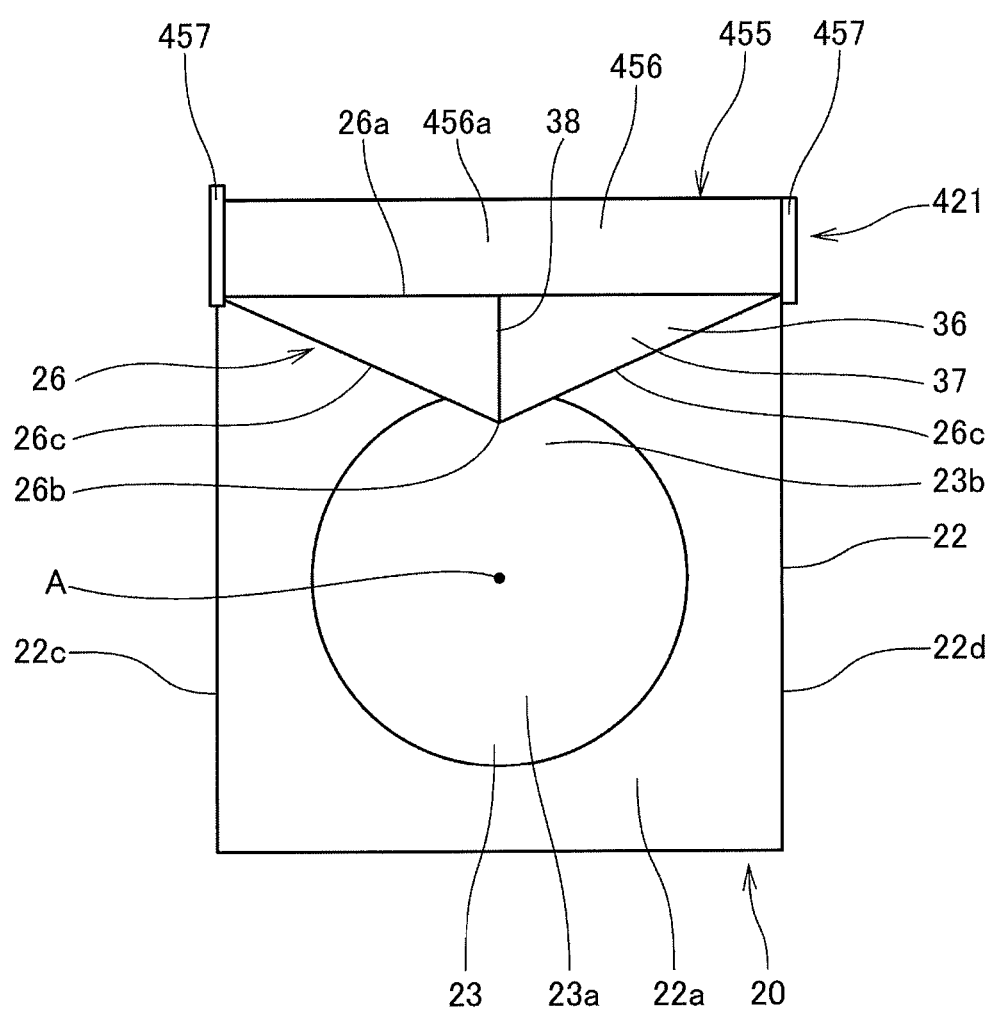
FIG. 12 shows a camera that is viewed in an optical axis direction.

FIG. 11 is a sectional view of the camera 20 in the fifth embodiment. FIG. 12 shows the camera 20 that is viewed in the optical axis direction.

The camera 20 can be provided to any of the rear part, the side part, the top part, the bottom part, and the front part of the automobile 10 and images downward side outside the automobile 10. The camera 20 is tiltedly provided so that the optical axis A and the lens mounting surface 22a will face downward side outside the automobile 10.

The camera 20 includes a waterdrop guiding part 421 (waterdrop guiding member), and the waterdrop guiding part 421 includes the casing side waterdrop guiding part 26 and a top surface side waterdrop guiding part 455.

The top surface side waterdrop guiding part 455 is provided on the top surface 22e of the casing 22 of the camera 20. By providing the top surface side waterdrop guiding part 455, the top surface of the camera 20 is formed with an outside surface 456 which is tilted by a degree that is greater than the tilt angle of the top surface 22e. The outside surface 456 has a tilt angle of less than 90 degrees relative to the horizontal plane H and is formed with a water-repellent layer 456a.

The outside surface 456 has a pair of ribs 457 and 457 which vertically extend, at both side edges in the width direction. The ribs 457 and 457 are provided over the entirety of the both side edges of the outside surface 456, and a lower end of each of the ribs 457 and 457 is connected to the upper edge 26a of the casing side waterdrop guiding part 26.

A waterdrop W4 which adheres on the top surface side waterdrop guiding part 455 from above flows down along the outside surface 456 and flows to the lens 23 along the outer surface 36. In the fifth embodiment, the waterdrops adhering on the top surface side waterdrop guiding part 455 are efficiently guided to the casing side waterdrop guiding part 26 by the ribs 457 and 457, whereby a water film is efficiently formed on the lens 23.

Sixth Embodiment

Hereinafter, the sixth embodiment, in which the present invention is applied, is described with reference to FIGS. 11 and 12. In the sixth embodiment, the parts which are constructed in the same manner as in the fifth embodiment are represented by the same reference symbols as the parts in the fifth embodiment, and descriptions for the parts are omitted.

Figure 13:
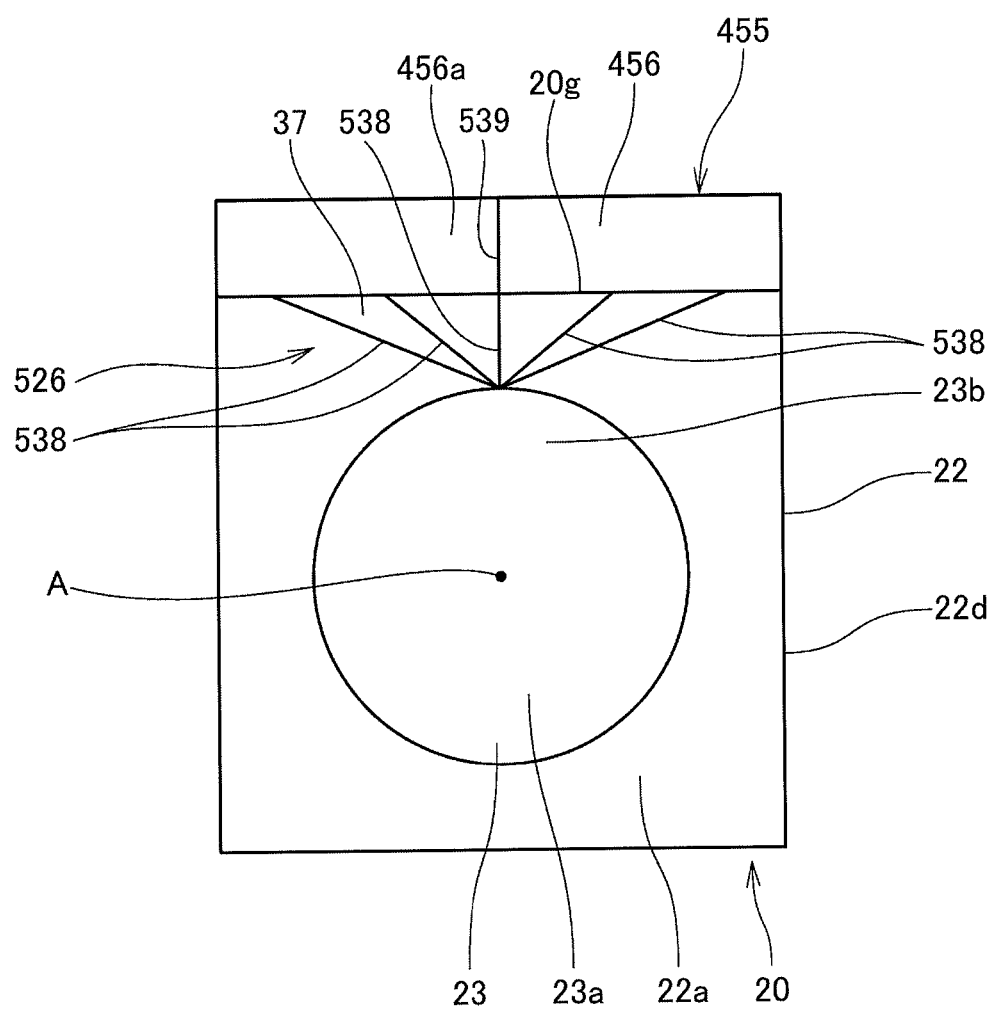
FIG. 13 shows a camera that is viewed in an optical axis direction in a sixth embodiment.

FIG. 13 shows the camera 20 that is viewed in the optical axis direction in the sixth embodiment.

In the sixth embodiment, a casing side waterdrop guiding part 526 for guiding waterdrops to the lens 23 is integrally formed on the lens mounting surface 22a. The casing side hydrophilic layer 37 is provided to the casing side waterdrop guiding part 526. The casing side waterdrop guiding part 526 includes multiple linear grooves 538 which extend from the rear end 20g of the camera 20 to the center of the upper portion 23b of the lens 23. In the sixth embodiment, the ribs 457 and 457 that are described in the fifth embodiment are not provided on the outside surface 456, but a vertically-extending groove 539 is provided at the center of the outside surface 456.

Thus, by providing the casing side waterdrop guiding part 526 to the casing 22, the waterdrops are guided to the lens 23 by a simple structure.

Here, the grooves 538 and 539 for guiding waterdrops may be protrusions.

Seventh Embodiment

Hereinafter, the seventh embodiment, in which the present invention is applied, is described with reference to FIG. 14. In the seventh embodiment, the parts which are constructed in the same manner as in the fifth embodiment are represented by the same reference symbols as the parts in the fifth embodiment, and descriptions for the parts are omitted.

Figure 14:
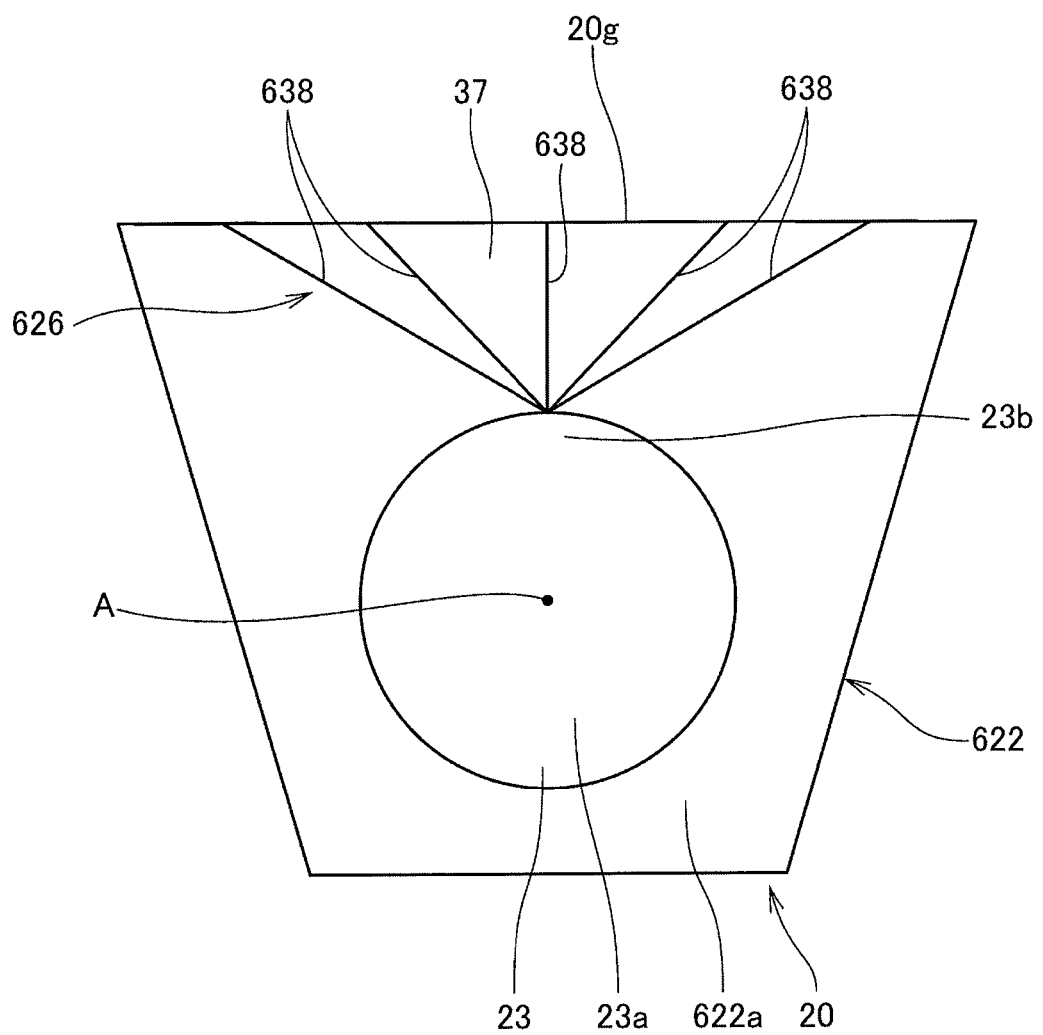
FIG. 14 shows a camera that is viewed in an optical axis direction in a seventh embodiment.

FIG. 14 shows the camera 20 that is viewed in the optical axis direction in the seventh embodiment.

In the seventh embodiment, a casing 622 of the camera 20 is formed so that the upper portion is wider than the lower portion. The casing 622 includes a lens mounting surface 622a which has an approximately trapezoidal shape, in which the upper edge side is longer than the lower edge side in the front view. A casing side waterdrop guiding part 626 for guiding waterdrops to the lens 23 is integrally formed at the upper portion of the lens mounting surface 622a. The casing side hydrophilic layer 37 is provided to the casing side waterdrop guiding part 626.

The casing side waterdrop guiding part 626 includes multiple linear grooves 638 which extend from the rear end 20g to the center of the upper portion 23b of the lens 23. Thus, the lens mounting surface 622a is formed into the approximately trapezoidal shape, in which the upper portion is wide, and the casing side waterdrop guiding part 626 is provided to the upper portion, whereby the area of the casing side waterdrop guiding part 626 is increased, and the waterdrops are efficiently guided to the lens 23.

Eighth Embodiment

Hereinafter, the eighth embodiment, in which the present invention is applied, is described with reference to FIGS. 15 and 16. In the eighth embodiment, the parts which are constructed in the same manner as in the fifth embodiment are represented by the same reference symbols as the parts in the fifth embodiment, and descriptions for the parts are omitted.

Figure 15:
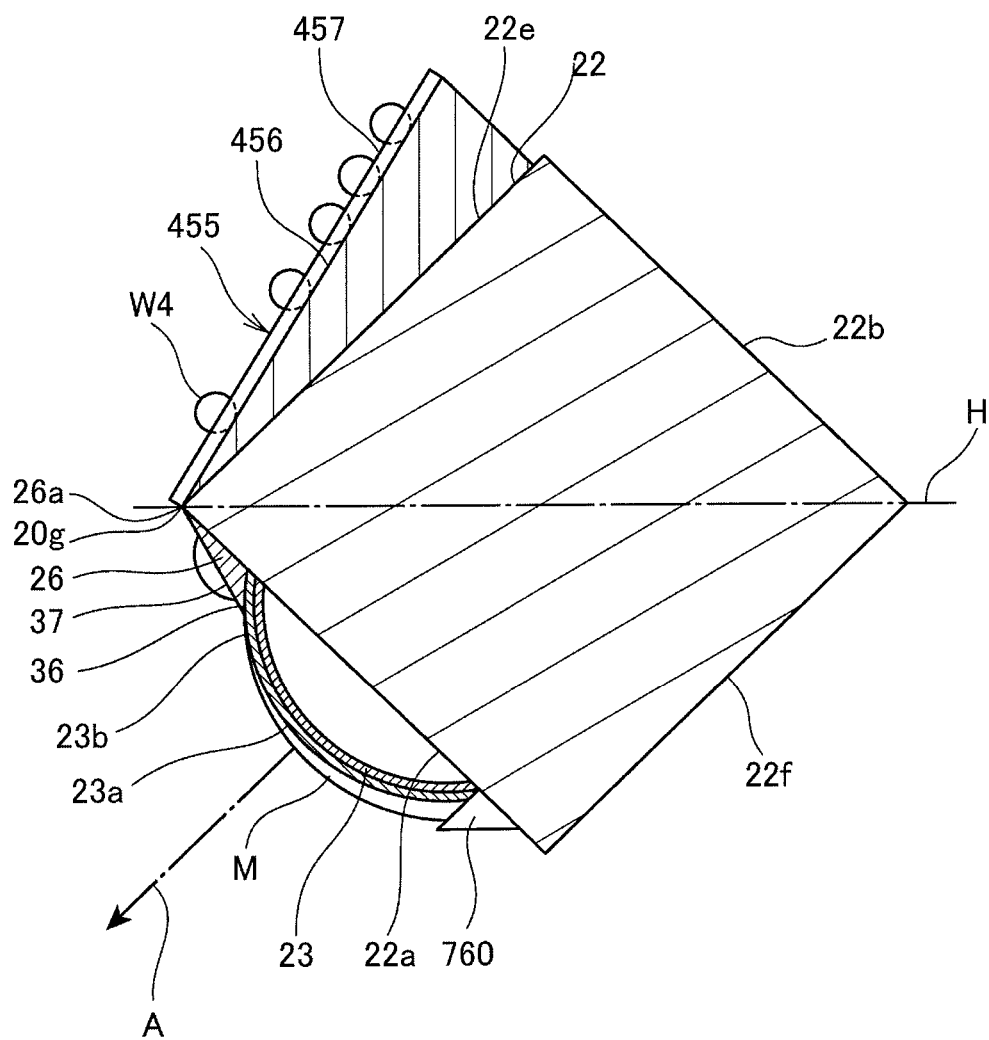
FIG. 15 is a sectional view of a camera in an eighth embodiment.
Figure 16:
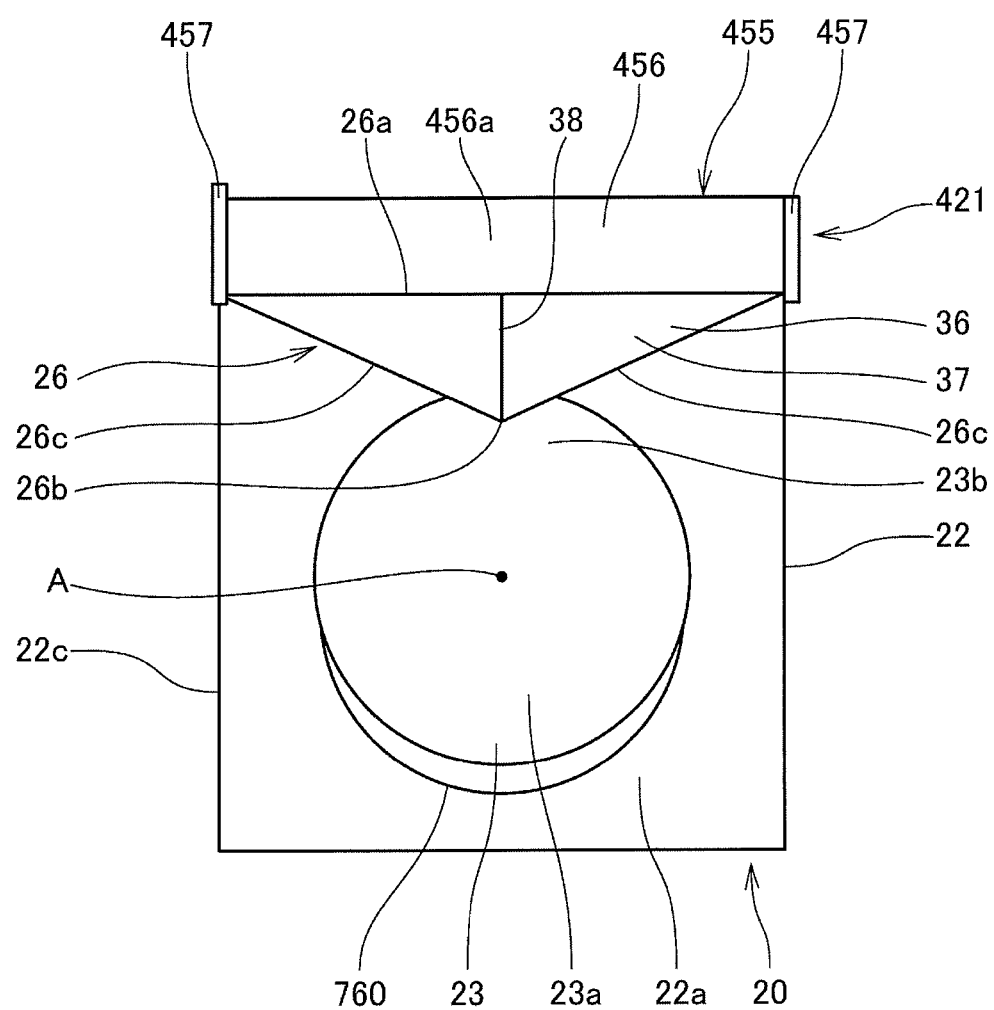
FIG. 16 shows a camera that is viewed in an optical axis direction.

FIG. 15 is a sectional view of the camera 20 in the eighth embodiment. FIG. 16 shows the camera 20 that is viewed in the optical axis direction.

In the eighth embodiment, the camera 20 includes a water retaining part 760 which is formed into a circularly arc shape along the lower edge of the lens 23 in the front view. The water retaining part 760 protrudes from the lens mounting surface 22*a* in the direction of the optical axis A. By providing the water retaining part 760, water is easily retained between the water retaining part 760 and the lower edge of the lens 23.

According to the eighth embodiment, the water retaining part 760 which protrudes from the vicinity of the lower edge of the lens 23 in approximately the direction of the optical axis A is provided, whereby waterdrops are retained in the vicinity of the water retaining part 760, and a water film M is easily maintained on the surface of the lens 23.

Naturally, the water retaining part 760 can be provided to the structure in each of the first to the seventh embodiments.

Each of the first to the eighth embodiments shows an embodiment, in which the present invention is applied, and the present invention is not limited to the first to the eighth embodiments described above.

The first and the second embodiments are described by providing the lens side hydrophilic layer 23*a* on the lens 23. However, in the present invention, the lens may include a lens protecting member which is provided on the outside of the lens 23 so as to protect the lens 23 of the camera 20. That is, in the camera including the lens protecting member, the lens side hydrophilic layer 23*a* is provided on the surface of the lens protecting member that constitutes the outermost surface of the lens.

REFERENCE SIGNS LIST

10 automobile (vehicle)
11 trunk lid
13 imaging device (vehicle mounted imaging device)
16 finishing plate
17 eaves
17*a* eaves lower edge portion (lower edge portion of eaves)
20 camera
21 waterdrop guiding part (waterdrop guiding member)
22 casing
23 lens
23*a* lens side hydrophilic layer (hydrophilic surface treatment)
25, 227, 327 vehicle side waterdrop guiding part (waterdrop guiding member)
26, 526, 626 casing side waterdrop guiding part
27 waterdrop guiding plate part (waterdrop guiding plate)
27*a* lower edge (lower edge of waterdrop guiding plate)
27*b* upper edge (upper edge of waterdrop guiding plate)
30 outside surface
31 inside surface
32 water-repellent layer (water-repellent layer provided on the inside surface of the waterdrop guiding plate)
33 hydrophilic layer (hydrophilic layer provided on the outside surface of the waterdrop guiding plate)
34, 38 grooves
37 casing side hydrophilic layer (hydrophilic layer)
39 connecting portion
127 waterdrop guiding plate (waterdrop guiding member)
140 outside gutter-like portion (gutter-like part)
141 inside gutter-like portion (gutter-like part)
330*a*, 456*a* water-repellent layer
421 waterdrop guiding part (waterdrop guiding member)
760 water retaining part
A optical axis
S1 space (space from lower edge portion of eaves)

The invention claimed is:

1. An imaging device comprising:
a camera having a lens, in which a hydrophilic surface treatment is applied on a surface of the lens; and
a waterdrop guiding part that is configured to guide waterdrops to the lens,
wherein the waterdrop guiding part is formed into a triangle shape which protrudes to a lower side in a front view,
a lower end, of the waterdrop guiding part, which is a top point of the triangle shape overlaps the surface of the lens in a front view and the lower end of the water drop guiding part is provided in contact with the surface of the lens.

2. The imaging device according to claim 1, wherein the waterdrop guiding part is positioned over the lens and includes a groove or a protrusion which guides the waterdrops to the lens.

3. The imaging device according to claim 1, wherein the camera is mounted on a vehicle, and the waterdrop guiding part includes a vehicle side waterdrop guiding part which extends from the vehicle to the vicinity of a casing of the camera and includes a casing side waterdrop guiding part which is provided to the casing.

4. The imaging device according to claim 1, wherein the camera is tiltedly provided so that an optical axis is directed obliquely downward, and the waterdrop guiding part supplies the waterdrops from above to the lens.

5. The imaging device according to claim 1, wherein when the waterdrop guiding part has a tilt angle of less than 90 degrees relative to a horizontal plane H, a water-repellent layer is provided on a surface of the waterdrop guiding part.

6. The imaging device according to claim 1, wherein when the waterdrop guiding part has a tilt angle of not less than 90 degrees relative to a horizontal plane H, a hydrophilic layer is provided on a surface of the waterdrop guiding part.

7. The imaging device according to claim 1, wherein the waterdrop guiding part includes a waterdrop guiding plate which is arranged over the lens by making a lower edge of the waterdrop guiding plate close to the lens, and the waterdrop guiding plate is tiltedly arranged relative to a horizontal plane H.

8. The imaging device according to claim 1, wherein the camera includes a water retaining part which protrudes from the vicinity of a lower edge of the lens in the approximately optical axis direction.

9. The imaging device according to claim 1, wherein the waterdrop guiding part is a casing side waterdrop guiding part that is provided to a casing of the camera,
- a waterdrop guiding plate that is in a plate-shape is further provided,
- a lower edge of the waterdrop guiding plate is positioned at a same height as an upper edge of the casing side waterdrop guiding part,
- the lower edge of the waterdrop guiding plate is arranged outer than the upper edge of the casing side waterdrop guiding part so that a space is formed between the lower edge of the waterdrop guiding plate and the upper edge of the casing side waterdrop guiding part.

10. An imaging device comprising:
- a camera having a lens, in which a hydrophilic surface treatment is applied on a surface of the lens; and
- a waterdrop guiding part that is configured to guide waterdrops to the lens,
- wherein the camera is arranged under an eaves of a vehicle, the lens is arranged at an inner side of the vehicle than a lower edge portion of the eaves, the waterdrop guiding plate is vertically extendingly provided so as to connect the lower edge portion of the eaves and the lens, and an upper edge of the waterdrop guiding plate is arranged outer than an outer side of the lower edge portion of the eaves so that a space is formed between the upper edge of the waterdrop guiding plate and the lower edge portion of the eaves.

11. The imaging device according to claim 10, wherein at least one of a water-repellent layer which is provided on an inside surface of the waterdrop guiding plate and a hydrophilic layer which is provided on an outside surface of the waterdrop guiding plate is provided.

12. The imaging device according to claim 10, wherein the eaves is a finishing panel which is mounted on an outer surface of a trunk lid in a rear side of the vehicle and which extends laterally, and the waterdrop guiding plate is laterally extendingly arranged between the finishing panel and the lens.

13. The imaging device according to claim 12, wherein a lower edge of the waterdrop guiding plate is formed with a gutter-like part that extends laterally, and the gutter-like part is slanted so that waterdrops flows in the gutter-like part to the lens.

14. A waterdrop guiding member configured to guide waterdrops that adhere on a vehicle to a lens of a camera, the camera having a lens that is applied with a hydrophilic surface treatment and being provided on the vehicle, and the waterdrop guiding member including a groove or a protrusion that is provided over the lens so as to guide the waterdrops to the lens,
- the camera is arranged under an eaves of the vehicle,
- the lens is arranged at an inner side of the vehicle than a lower edge portion of the eaves,
- the waterdrop guiding member is arranged by making a lower edge portion of the waterdrop guiding member close to the lens, and
- a waterdrop guiding part is provided in contact with the surface of the lens.

15. The waterdrop guiding member according to claim 14, wherein when the waterdrop guiding member has a tilt angle of less than 90 degrees relative to a horizontal plane H, a water-repellent layer is provided on a surface of the waterdrop guiding member.

16. The waterdrop guiding member according to claim 14, wherein when the waterdrop guiding member has a tilt angle of not less than 90 degrees relative to a horizontal plane H, a hydrophilic layer is provided on a surface of the waterdrop guiding member.

17. The waterdrop guiding member according to claim 14, comprising:
- a vehicle side waterdrop guiding part which extends from the vehicle to the vicinity of a casing of the camera; and
- a casing side waterdrop guiding part which is provided to the casing.

18. The waterdrop guiding member according to claim 17, wherein the vehicle side waterdrop guiding part includes
- a waterdrop guiding plate which is tiltedly arranged relative to a horizontal plane H over the lens by making a lower edge of the waterdrop guiding plate close to the lens,
- a water-repellent layer is provided on a first surface of the waterdrop guiding plate, which has a tilt angle of less than 90 degrees relative to the horizontal plane H, and
- a hydrophilic layer is provided on a second surface of the waterdrop guiding plate, which has a tilt angle of not less than 90 degrees relative to the horizontal plane H.

* * * * *